C. C. HUDSON.
SPRING MOUNTING.
APPLICATION FILED MAY 14, 1921.
1,418,799.
Patented June 6, 1922.
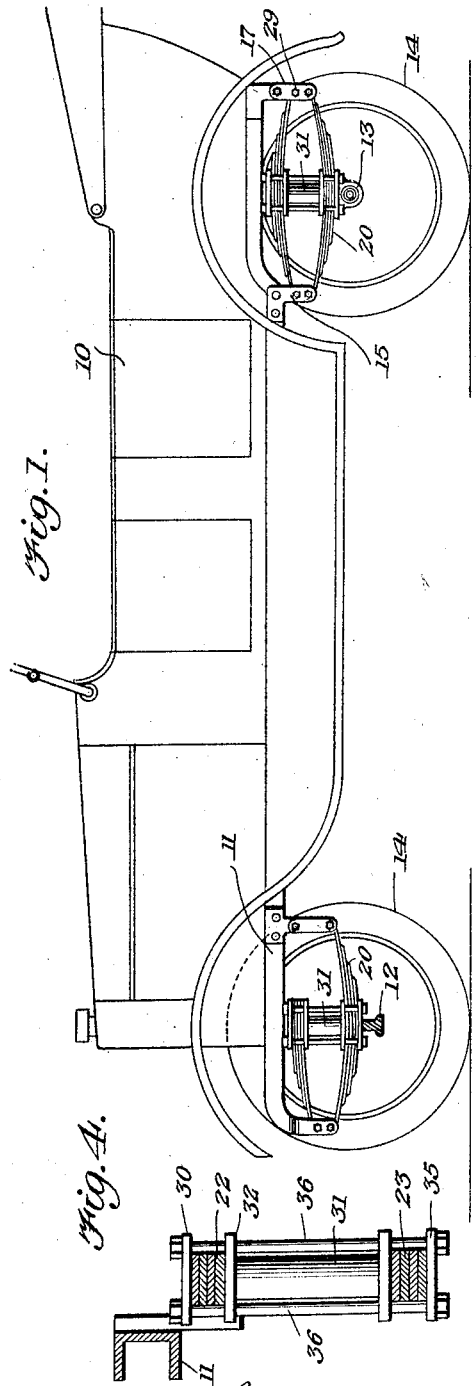
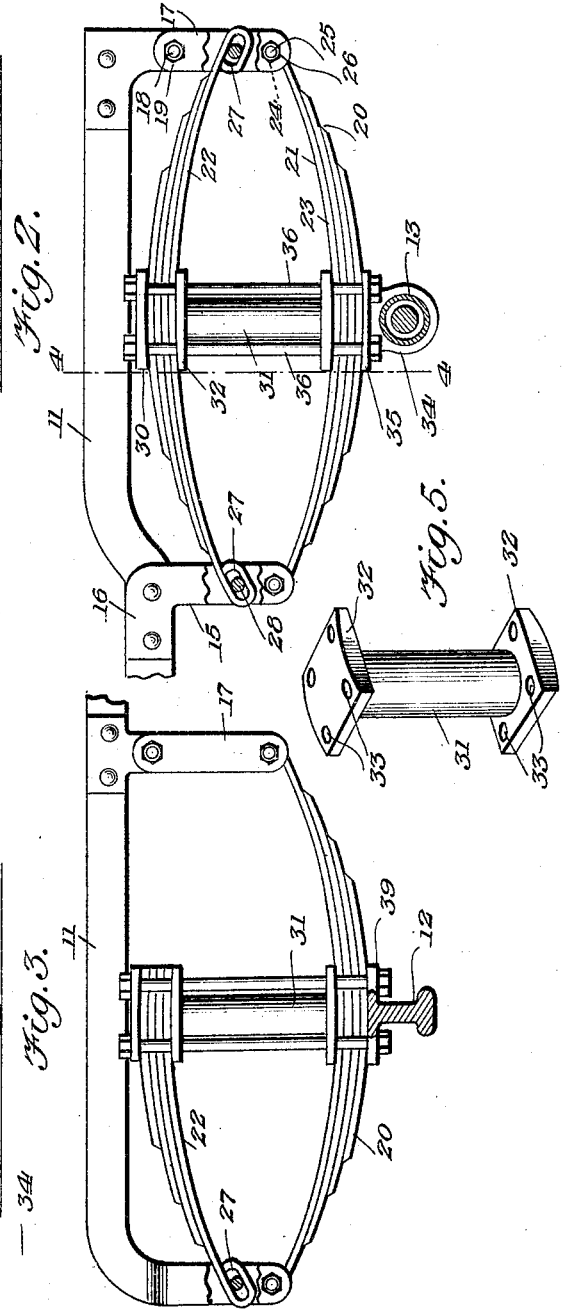
Charles C. Hudson
INVENTOR
BY Victor J. Evans
ATTORNEY

UNITED STATES PATENT OFFICE.

CHARLES C. HUDSON, OF ATLANTA, GEORGIA.

SPRING MOUNTING.

1,418,799.      Specification of Letters Patent.      Patented June 6, 1922.

Application filed May 14, 1921. Serial No. 469,671.

*To all whom it may concern:*

Be it known that I, CHARLES C. HUDSON, a citizen of the United States, residing at Atlanta, in the county of Fulton and State of Georgia, have invented new and useful Improvements in Spring Mountings, of which the following is a specification.

This invention relates to vehicle springs and has for its main object the provision of means for anchoring the springs to the axles of the vehicles to receive the shock and rebound which occurs when the vehicle is passing over uneven surfaces.

Another object of the invention is to provide an anchoring means insuring substantially equally distribution of the shock and rebound of the springs which are preferably of the leaf type.

A further object of the invention is to provide an anchoring means which is simple in construction and readily adapted for use in connection with elliptic, semi-elliptic, and three quarter elliptic springs.

With these and other objects in view which will become apparent as this description progresses, drawings have been annexed as a part of this disclosure in which like reference characters denote corresponding parts and in which:

Figure 1 is a side elevation of an automobile showing my invention applied to the springs on which the automobile body is suspended.

Figure 2 is a side elevation partly in section showing my invention applied to a full elliptic spring.

Figure 3 is a view similar to Figure 2 showing the invention applied to a three quarter elliptic spring.

Figure 4 is a vertical sectional view on the line 4—4 of Figure 2 and

Figure 5 is a detail perspective view of a spacing member forming part of the anchoring means for the springs.

In the drawings the automobile, shown conventionally in Figure 1, includes the usual body 10, frame 11, front and rear axles 12 and 13 respectively and wheels 14. Referring more particularly to Figures 2 and 3, the frame 11 carries a bracket 15 having a bifurcated lower end, the upper end of which is rigidly secured to the frame at 16 by bolts or other suitable fastening means. The upper ends of a pair of shackles 17 are pivotally connected to a pin 18 extending from an L-shaped plate 19 which is secured to the frame.

A spring 20 constructed of a plurality of leaves 21, is shown as having an upper portion 22 and a lower portion 23, the said portion being bowed and connected to form springs of the types referred to as will presently appear. One of the leaves 21 of the portions 22 and 23 is bent adjacent one end to form bearings 24 which are adapted to receive bolts 25 extending through openings in the lower end of the shackles 17 and having threaded engagement with nuts 26, the bolts 25 forming a pivotal connection between portions of the spring 20 and the lower end of the shackle 17.

The opposite ends of the same leaf in each of the portions 22 and 23 are also bent to form elongated slotted bearings 27, adapted to receive bolts 28 which extend through openings in the lower end of the bracket 15 and having threaded engagement with nuts 29, the bolts 28 forming a pivotal connection between the bracket 15 and the spring 20 and the slotted bearings 27 permitting expansion and contraction of the spring portions 22 and 23.

The anchoring means comprises a rectangularly shaped plate, which is somewhat wider than the leaves 21 of the spring, the inner face of which is slightly curved to form a close fit with a top surface of the upper spring portion 22. A plate 30 is positioned centrally with respect to the length of the spring 20, and in substantially vertical alignment with a cylindrical spacing member 31 interposed between the portions of the spring 20. The spacing member 31 is disposed in direct vertical alignment above the axle 13, the axle being journaled in a bearing block 34 and provided with an outwardly extending flange 35. The spring 20 rests on the bearing block 34 and is rigidly anchored to the axle 13 by bolts 36. As shown in Figure 5, a pair of substantially rectangular shaped plates 32 having curved faces engaging the inner sides of the upper and lower portions of the spring are formed integrally with the opposite ends of the spacing member 31 and are provided with openings 33 for the purpose of receiving the bolts 36. In the assembling shown in Figures 2 and 4 the bolts 36 pass through openings adjacent the edges of the plate 30 in vertical alignment with the openings 33 in the plates 32 and extend through aligned openings in the bearing block 34 to receive a nut 37 having threaded engagement with the lower ends of the bolts. The upper ends of the bolts extend above the top surface of the plate 30 and have threaded engagement with nuts 38, the bolts and nuts thus serving to clamp the spring 20 to the spacing member 31 and centrally anchor the springs to the axle.

The assembly shown in Figure 3 is practically the same as above described except that the spring 20 is of the three-quarter elliptic type formed by cutting the upper portion 22 in half. The front axle 12 is I-shaped in cross section the flanges 39 of which are extended to form a rest for the spring. In either case upon occurrence of shock by the vehicle passing over uneven surfaces, the spring 20 will have a rocking pivotal motion at the shackle end and a pivotal motion at the bracket end. The force of the shock and rebound will be distributed equally to the leaves 21 and both sides of the spacing member 31, and the expansion and contraction of the portions of the spring will be accommodated by the slots in the ends of the portions adjacent the brackets. The spacing member 31 prevent any up and down motion of the portions of the spring, thus insuring that the force of the shock and rebound will be absorbed at the ends of the spring instead of centrally thereof, overcoming an objectionable feature of present spring equipment. It is obvious that the shock and rebound can be accommodated with a minimum motion between the spring and the vehicle, which is one of the advantages of the anchoring means disclosed herewith, and that the spacing member may be a block which is either solid or tubular in cross section.

It is obvious that various changes in construction of the invention may be made without departing from the scope of the following claims, and it is to be understood that the present disclosure is by way of illustration only and is not to be taken as constrictive of my conception.

What I claim is:—

In combination with a vehicle spring having a rocking and pivotal connection between a frame and an axle, of a pair of plates engaging the inner surfaces of the upper and lower portions of said spring, a cylindrical spacing member formed integrally with said plates and means coacting with the spring and plates for firmly anchoring the spring centrally to said axle.

In testimony whereof I affix my signature.

CHARLES C. HUDSON.